US012759715B2

(12) United States Patent
Stanescu et al.

(10) Patent No.: US 12,759,715 B2
(45) Date of Patent: Oct. 13, 2026

(54) STRUCTURE FOR TRANSFERRING A LATERAL LOAD OF AN ENGINE PYLON TO AN AIRCRAFT WING

(71) Applicant: The Boeing Company, Arlington, VA (US)

(72) Inventors: Adrian Stanescu, Maple Valley, WA (US); Donald T. Powell, Everett, WA (US); Kyle Stevens, Mill Creek, WA (US); Reed D. Wilson, Kirkland, WA (US); Druh Palma, Mill Creek, WA (US)

(73) Assignee: The Boeing Company, Arlington, VA (US)

( * ) Notice: Subject to any disclaimer, the term of this patent is extended or adjusted under 35 U.S.C. 154(b) by 136 days.

(21) Appl. No.: 18/772,746

(22) Filed: Jul. 15, 2024

(65) Prior Publication Data

US 2026/0015096 A1 Jan. 15, 2026

(51) Int. Cl.
*B64D 27/40* (2024.01)

(52) U.S. Cl.
CPC .................................... *B64D 27/40* (2024.01)

(58) Field of Classification Search
CPC .... B64D 27/40; B64D 27/402; B64D 27/404; B64D 27/406
See application file for complete search history.

(56) References Cited

U.S. PATENT DOCUMENTS

2018/0346137 A1* 12/2018 West .......................... B64C 3/32
2023/0331391 A1 10/2023 Torjesen
2024/0150028 A1 5/2024 Pautis

OTHER PUBLICATIONS

EPO, Extended European Search Report, Appl. No. 25173264.0, issued on Sep. 9, 2025.

* cited by examiner

*Primary Examiner* — Justin Michael Heston

(57) ABSTRACT

A structure for transferring a lateral load of an engine pylon to an aircraft wing includes a first component having a generally longitudinally oriented first flange extending outward from a first base portion that is attachable to or integrated with the wing, a second component having one or more raised portions extending outward from a second base portion that is attachable to or integrated with the engine pylon, and a bushing with a base plate and one or two arms. The bushing may be disposed in contact with a wall portion with part of the first flange disposed within the bushing, or in contact with a raised portion with part of the bushing disposed between the first flange and a second flange, such that the engine pylon is substantially restrained against lateral movement with respect to the wing.

20 Claims, 12 Drawing Sheets

STRUCTURE FOR TRANSFERRING A LATERAL LOAD OF AN ENGINE PYLON TO AN AIRCRAFT WING

INTRODUCTION

This disclosure relates to structures for transferring a lateral load of an engine pylon to a wing of an aircraft.

In many fixed-wing, turbofan aircraft, two or more engines may be used to propel the aircraft. These engines may be releasably attached to the wings using a pylon between each engine and wing. This provides the benefit of not having to attach the engines directly to the wings, thus providing the ability to more easily remove or separate an engine from its associated wing. However, such pylons need to transfer loads in all degrees of freedom from an engine to the wing.

SUMMARY

According to one embodiment, a structure is provided for transferring a lateral load of an engine pylon to a wing of an aircraft, wherein the aircraft defines a longitudinal direction and a lateral direction perpendicular to the longitudinal direction. The structure includes: (i) a first component having a first base portion and a first flange oriented generally longitudinally and extending outward from the first base portion, wherein the first base portion is attached to or made integral with one of the wing and the engine pylon; (ii) a second component having a second base portion, a first raised portion extending outward from the second base portion toward the first base portion to a first height, a second raised portion extending outward from the second base portion toward the first base portion to a second height and being laterally spaced apart from the first raised portion, and a wall portion extending outward from the second base portion between the first and second raised portions to a third height that is less than either of the first and second heights with the wall portion terminating at a wall portion end, wherein the second base portion is attached to or made integral with the other of the wing and the engine pylon; and (iii) a bushing having a base plate with laterally opposed first and second base plate ends, a first arm extending from the first base plate end, and a second arm extending from the second base plate end. The bushing is disposed with the base plate in contact with the wall portion end and with the first and second arms extending toward the first base portion, and at least part of the first flange is disposed between the first and second arms, such that the engine pylon is substantially restrained against lateral movement with respect to the wing.

The first and second arms may be disposed in contact with the first and second raised portions, respectively.

The structure may also include one or more spacers disposed in one or both of (i) a first position between the first flange and the first arm and (ii) a second position between the first flange and the second arm.

The structure may further include substantially no gap being provided between adjacent ones of the first raised portion, the first arm, the first flange, the second arm, the second raised portion and the one or more spacers The first flange may have a first pin hole defined therein, and the first raised portion may have a second pin hole defined therein in registration with the first pin hole, and the structure may further include a pin disposed through the first and second pin holes.

The wall portion may have a front face and a rear face, and the bushing may include one or both of a first tang extending outward from the base plate toward the second base portion and being disposed in contact with the front face, and a second tang extending downward from the base plate and being disposed in contact with the rear face.

The structure may include a second flange extending outward from the first base portion and running generally parallel with the first flange, thereby defining an interflange gap between the first and second flanges, wherein the first raised portion is disposed within the interflange gap. A thickness of the first raised portion may be less than a width of the interflange gap.

The first and second arms may be generally parallel with each other, and the first and second raised portions may be generally parallel with each other.

The wall portion may be attached to or made integral with the first and second raised portions.

According to another embodiment, a structure is provided for transferring a lateral load of an engine pylon to a wing of an aircraft, wherein the aircraft defines a longitudinal direction and a lateral direction perpendicular to the longitudinal direction, including: (i) a first component having a first base portion and a first flange extending outward from the first base portion; (ii) a second component having a second base portion, a first raised portion extending outward from the second base portion to a first height, a second raised portion extending outward from the second base portion to a second height and being laterally spaced apart from the first raised portion, and a wall portion extending outward from the second base portion between the first and second raised portions to a third height that is less than either of the first and second heights with the wall portion terminating at a wall portion end; and (iii) a bushing having a base plate with laterally opposed first and second base plate ends, a first arm extending from the first base plate end, and a second arm extending from the second base plate end. The first component, the second component and the bushing are configured to be assembled in an assembled state in which the first flange is oriented generally longitudinally, the bushing is disposed with the base plate in contact with the wall portion end and with the first and second arms extending toward the first base portion, and at least part of the first flange is disposed between the first and second arms, such that the first and second components are substantially restrained against lateral movement with respect to each other.

The first base portion may be attached to or made integral with one of the wing and the engine pylon, and the second base portion may be attached to or made integral with the other of the wing and the engine pylon.

In the assembled state, the engine pylon may be substantially restrained against lateral movement with respect to the wing.

The structure may further include one or more spacers disposed in one or both of (i) a first position between the first flange and the first arm and (ii) a second position between the first flange and the second arm.

According to yet another embodiment, a structure is provided for transferring a lateral load of an engine pylon to a wing of an aircraft, wherein the aircraft defines a longitudinal direction and a lateral direction perpendicular to the longitudinal direction. The structure includes: (i) a first component having a first base portion and a first flange oriented generally longitudinally and extending outward from the first base portion and a second flange extending outward from the first base portion and running generally parallel with the first flange, thereby defining an interflange gap between the first and second flanges, wherein the first base portion is attached to or made integral with one of the wing and the engine pylon; (ii) a second component having a second base portion and a raised portion extending outward from the second base portion toward the first base portion with the raised portion terminating at a raised portion end, wherein the second base portion is attached to or made integral with the other of the wing and the engine pylon; and (iii) one or more bushings each having a respective base plate with respective opposed first and second base plate ends and a respective first arm extending from the respective first base plate end. Each of the one or more bushings is disposed with its respective base plate in contact with the raised portion end and with its respective first arm extending toward the second base portion between the raised portion and the first or second flange, and at least part of the raised portion and at least part of the one or more bushings are disposed within the interflange gap, such that the engine pylon is substantially restrained against lateral movement with respect to the wing.

The one or more bushings may include two bushings, with one of the two bushings having its first arm on a first side of the raised portion and the other of the two bushings having its first arm on a second side of the raised portion laterally opposite the first side.

The structure may also include one or more spacers disposed in one or both of (i) a primary position between the first flange and a first adjacent one of the one or more bushings and (ii) a secondary position between the second flange and a second adjacent one of the one or more bushings.

Each of the one or more bushings may include a respective second arm extending from the respective second base plate end, with the first arm extending between the raised portion and the first flange and the second arm extending between the raised portion and the second flange.

The first flange may have a first pin hole defined therein, the raised portion may have a second pin hole defined therein in registration with the first pin hole, and the second flange may have a third pin hole defined therein in registration with the first and second pin holes, and the structure may further include a pin disposed through the first, second and third pin holes.

The one or more bushings may include two bushings having respective first arms that are generally parallel with each other and respective base plates that are laterally aligned with each other.

According to still another embodiment, a structure is provided for transferring a lateral load of an engine pylon to a wing of an aircraft, wherein the aircraft defines a longitudinal direction and a lateral direction perpendicular to the longitudinal direction including: (i) a first component having a first base portion and a first flange extending outward from the first base portion and a second flange extending outward from the first base portion and running generally parallel with the first flange, thereby defining an interflange gap between the first and second flanges; (ii) a second component having a second base portion and a raised portion extending outward from the second base portion with the raised portion terminating at a raised portion end; and (iii) one or more bushings each having a respective base plate with respective opposed first and second base plate ends and a respective first arm extending from the respective first base plate end. The first component, the second component and the one or more bushings are configured to be assembled in an assembled state in which the first and second flanges are oriented generally longitudinally, each of the one or more bushings is disposed with its respective base plate in contact with the raised portion end and with its respective first arm extending toward the second base portion between the raised portion and the first or second flange, and at least part of the raised portion and at least part of the one or more bushings are disposed within the interflange gap, such that the first and second components are substantially restrained against lateral movement with respect to each other.

The first base portion may be attached to or made integral with one of the wing and the engine pylon, and the second base portion may be attached to or made integral with the other of the wing and the engine pylon.

In the assembled state, the engine pylon may be substantially restrained against lateral movement with respect to the wing.

The structure may further include one or more spacers disposed in one or both of (i) a primary position between the first flange and a first adjacent one of the one or more bushings and (ii) a secondary position between the second flange and a second adjacent one of the one or more bushings.

The above features and advantages, and other features and advantages, of the present teachings are readily apparent from the following detailed description of some of the best modes and other embodiments for carrying out the present teachings, as defined in the appended claims, when taken in connection with the accompanying drawings.

DETAILED DESCRIPTION

Figure 1:
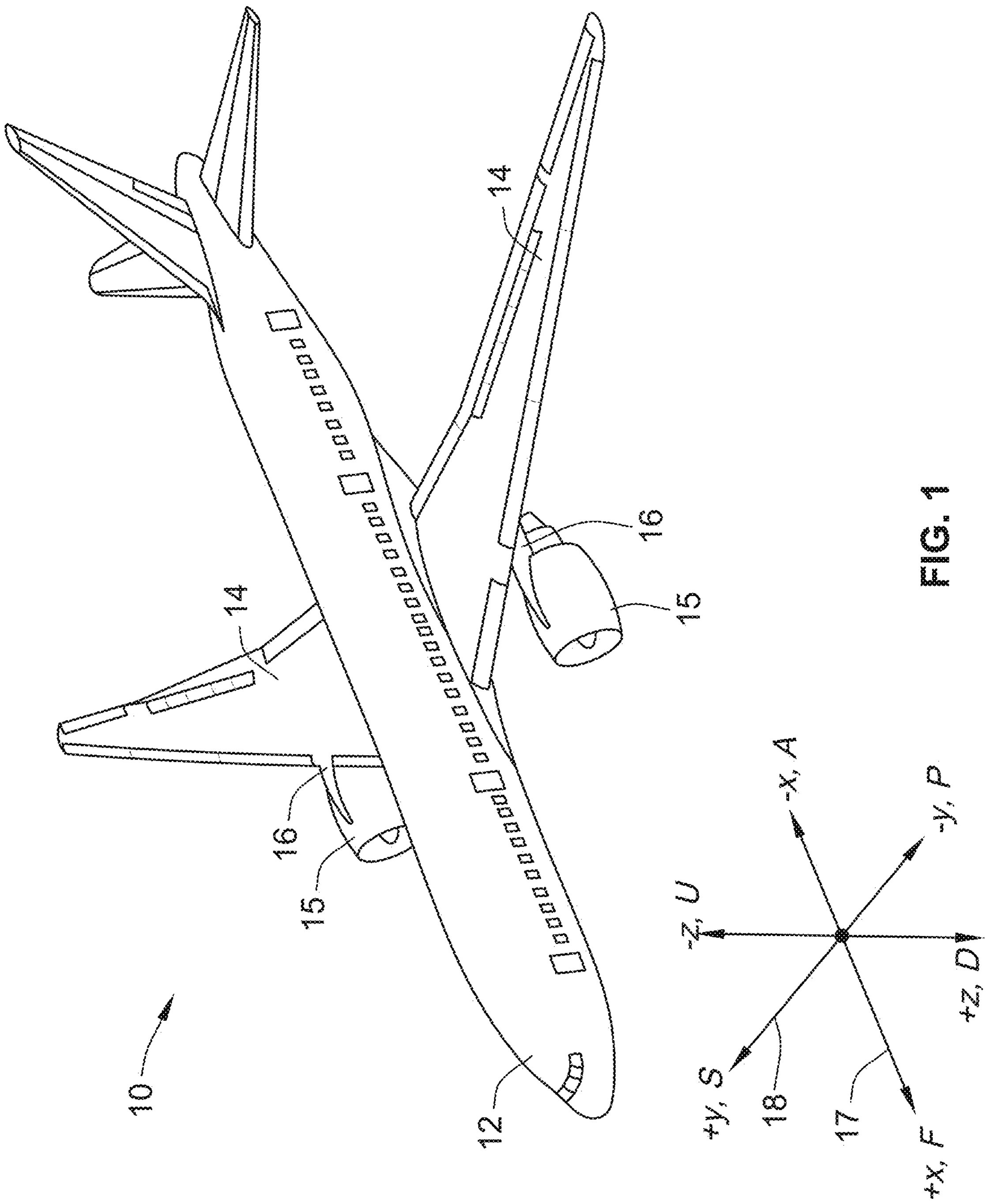
FIG. 1 is a schematic perspective view of an aircraft, along with various directions defined by the aircraft.

Referring now to the drawings, wherein like numerals indicate like parts in the several views, a structure 100 for transferring a lateral load $\mathbf{19}_L$ of an engine pylon 16 to a wing 14 of an aircraft 10 is shown and described herein.

Note that in some of the drawings, selected reference numerals are presented in parentheses with dotted lead lines leading to the respective elements; this is done to indicate elements which are hidden or obscured from direct view in those drawings, with those hidden or obscured elements also being shown in dashed lines.

FIG. 1 shows a perspective view of an aircraft 10 having a fuselage 12, two opposed fixed wings 14 and two or more engines 15 attached to the wings 14 via respective engine pylons 16. As illustrated by the coordinate axes, the aircraft 10 defines opposed forward and aftward directions F, A running along and parallel with the fuselage 12, and port and starboard directions P, S running perpendicular to the forward and aftward directions F, A. The aircraft 10 also defines a longitudinal direction 17 running along and parallel with the fuselage 12 (and therefore also along and parallel with the forward and aftward directions F, A), as well as a lateral or transverse direction 18 running perpendicular to the longitudinal direction 17 (and therefore also along and parallel with the starboard and port directions S, P). Additionally, the aircraft 10 also defines opposed upward and downward directions U, D.

Note that the coordinate axes, which follow the conventional right-hand rule, show the forward direction F pointing along the positive x-direction (+x), the aftward direction A pointing along the negative x-direction (−x), the starboard direction S pointing along the positive y-direction (+y), the port direction P pointing along the negative y-direction (−y), the downward direction D pointing along the positive z-direction (+z), and the upward direction U pointing along the negative z-direction (−z). Thus, the longitudinal direction 17 points along either or both of the forward and aftward directions F, A, and the lateral direction 18 points along either or both of the starboard and port directions S, P.

Figure 2:
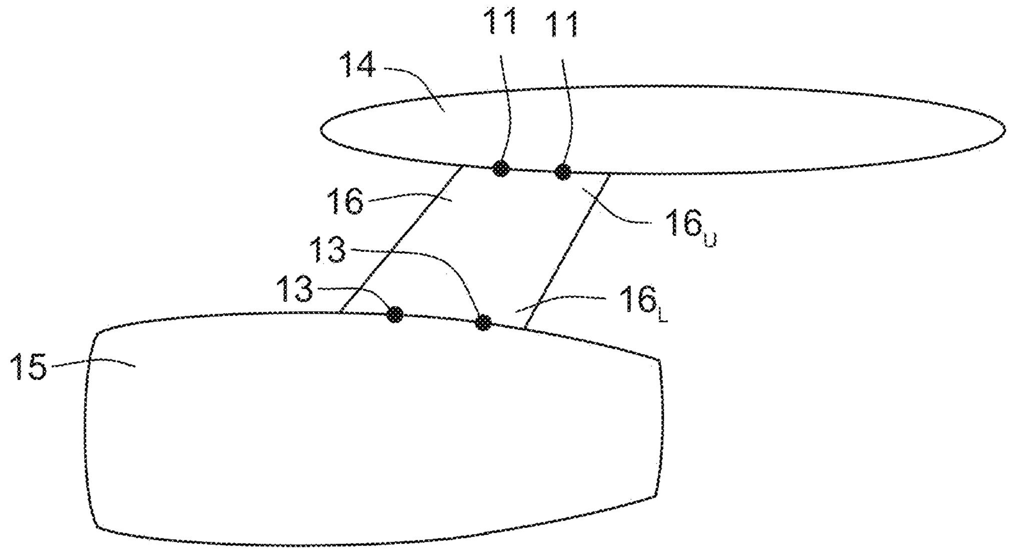
FIG. 2 is a schematic side view of an engine attached to a wing via an engine pylon.

FIG. 2 shows a schematic side view of an engine 15 attached to a wing 14 via an engine pylon 16. The engine pylon 16 has an upper pylon portion $\mathbf{16}_U$ that is attached to the wing 14 at two or more upper connection points 11, and a lower pylon portion $\mathbf{16}_L$ that is attached to the engine 15 at two or more lower connection points 13. These upper and lower connection points 11, 13 may include linkages, fasteners, fittings, shock absorbers and the like. The structure 100 of the present disclosure focuses primarily on (but is not limited to) an arrangement of hardware for facilitating the transfer of lateral loads $\mathbf{19}_L$ from an engine pylon 16 to a wing 14, such as at an upper pylon portion $\mathbf{16}_U$ of the engine pylon 16.

Figure 3:
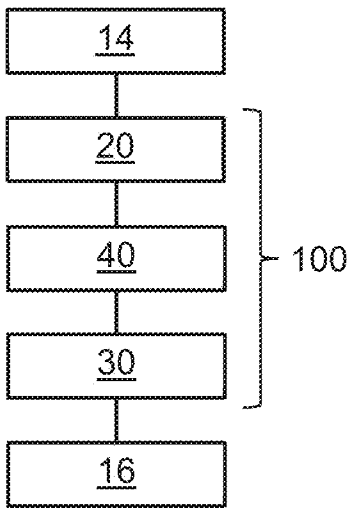
FIGS. 3-4 are block diagrams demonstrating two ways of arranging a structure according to the present disclosure.
Figure 4:
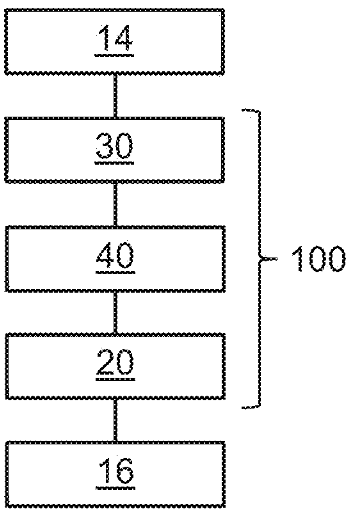

FIGS. 3-4 show block diagrams for two ways of arranging the structure 100 of the present disclosure. The structure 100 includes a first component 20, a second component 30 and a bushing 40. Generally speaking, these three elements may be viewed as being arranged in a vertical stack, with the bushing 40 being interposed between the first and second components 20, 30. For example, as shown in FIG. 3, the first component 20 may be disposed above the second component 30, with the first component 20 being attached to or made integral with a wing 14 and the second component 30 being attached to or made integral with an engine pylon 16. Alternatively, as shown in FIG. 4, the second component 30 may be disposed above the first component 20, with the second component 30 being attached to or made integral with a wing 14 and the first component 20 being attached to or made integral with an engine pylon 16. Thus, while some of the drawings show the first component 20 being disposed above the second component 30, it should be understood that the positions of these two components 20, 30 may be reversed, with the second component 30 being disposed above the first component 20. Similarly, in order to comport with the drawings, certain elements are described below as extending "upward" or "downward", or as being positioned "above" or "below" other elements or as being in an "upright" or "downward" orientation, but it should be understood that these are merely nominal descriptions which should not be viewed as limitations on the scope of the claims or of the present disclosure.

Figure 5:
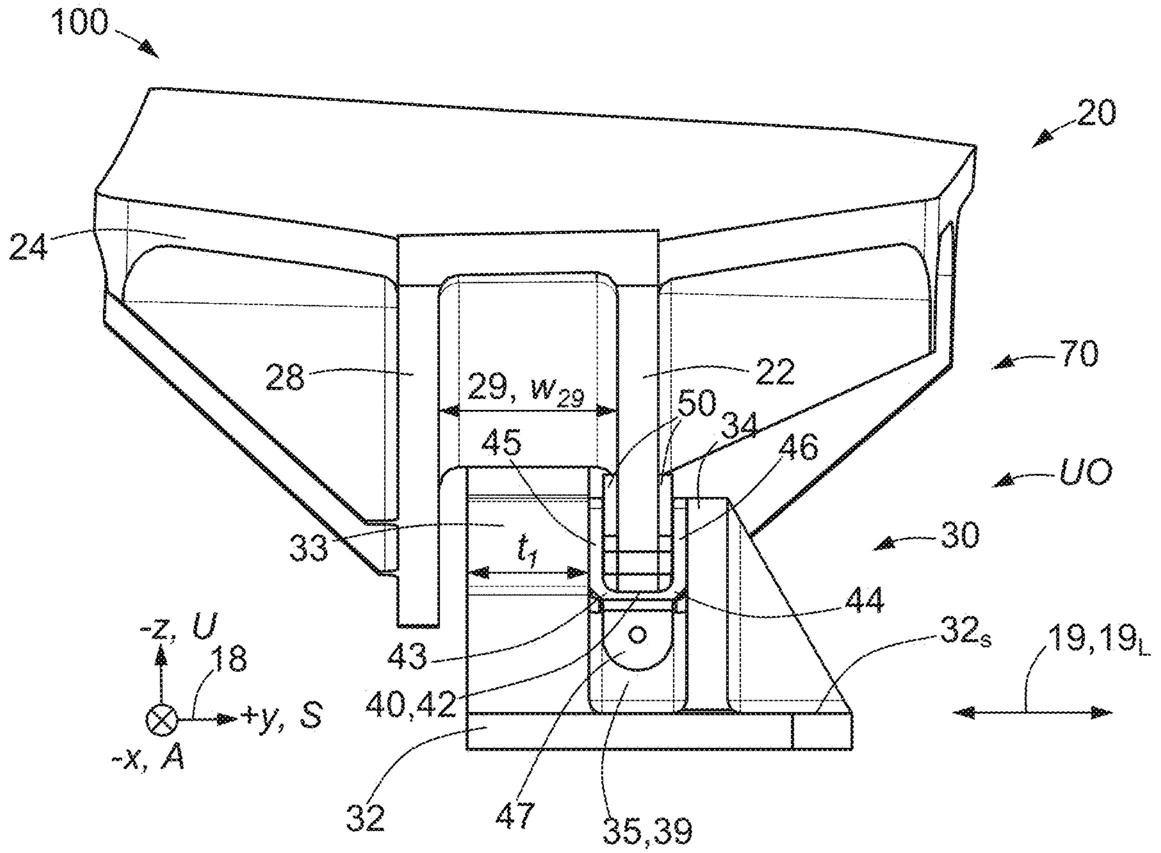
FIGS. 5-7 are rear elevation, underneath perspective and side views, respectively, of a structure for transferring a lateral load of an engine pylon to a wing of an aircraft, according to a first embodiment.
Figure 6:
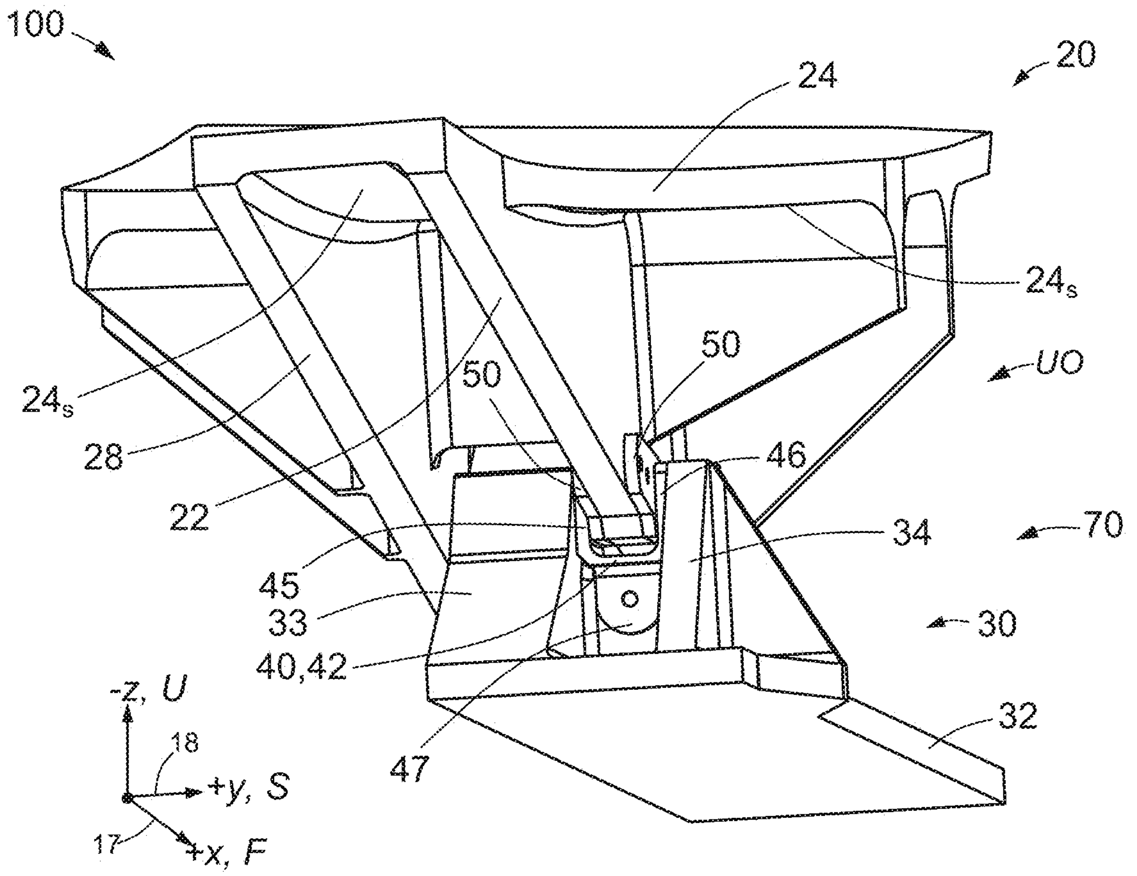
Figure 7:
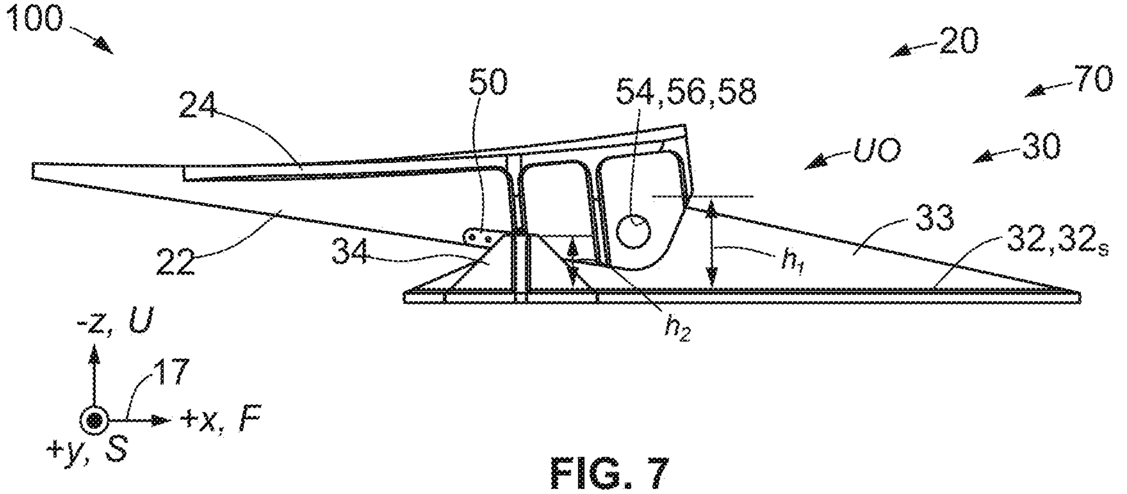
Figure 8:
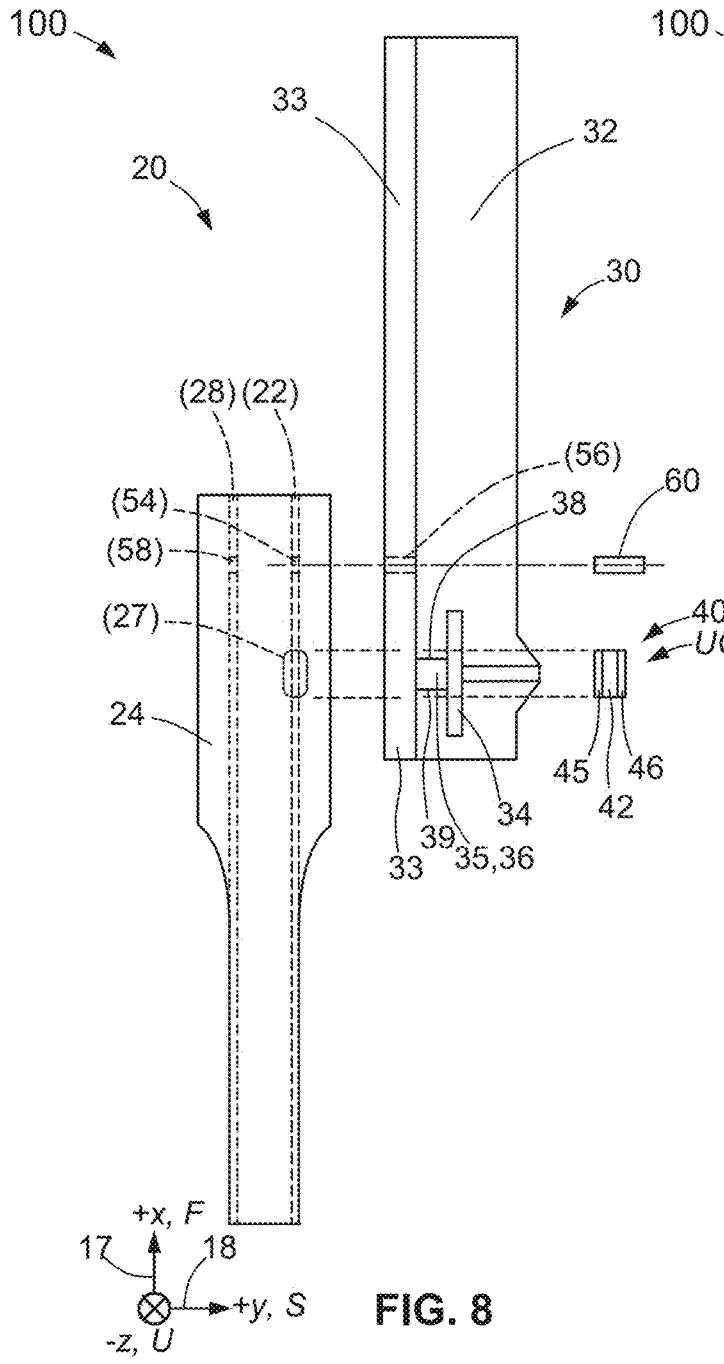
FIGS. 8-9 are exploded and assembled schematic top views, respectively, of the first embodiment.
Figure 9:
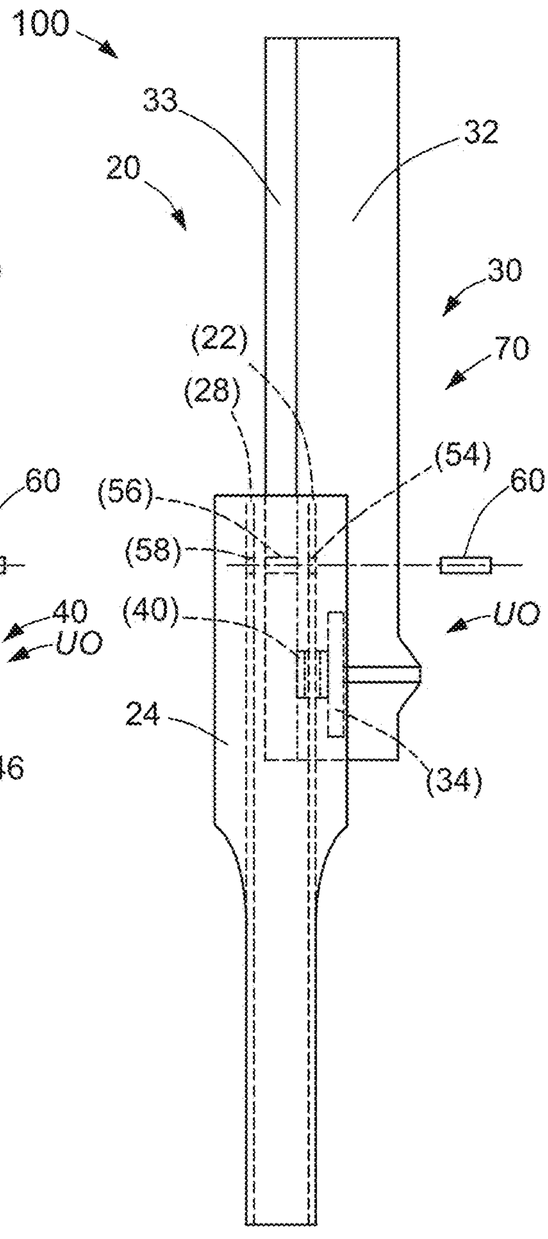
Figure 10:
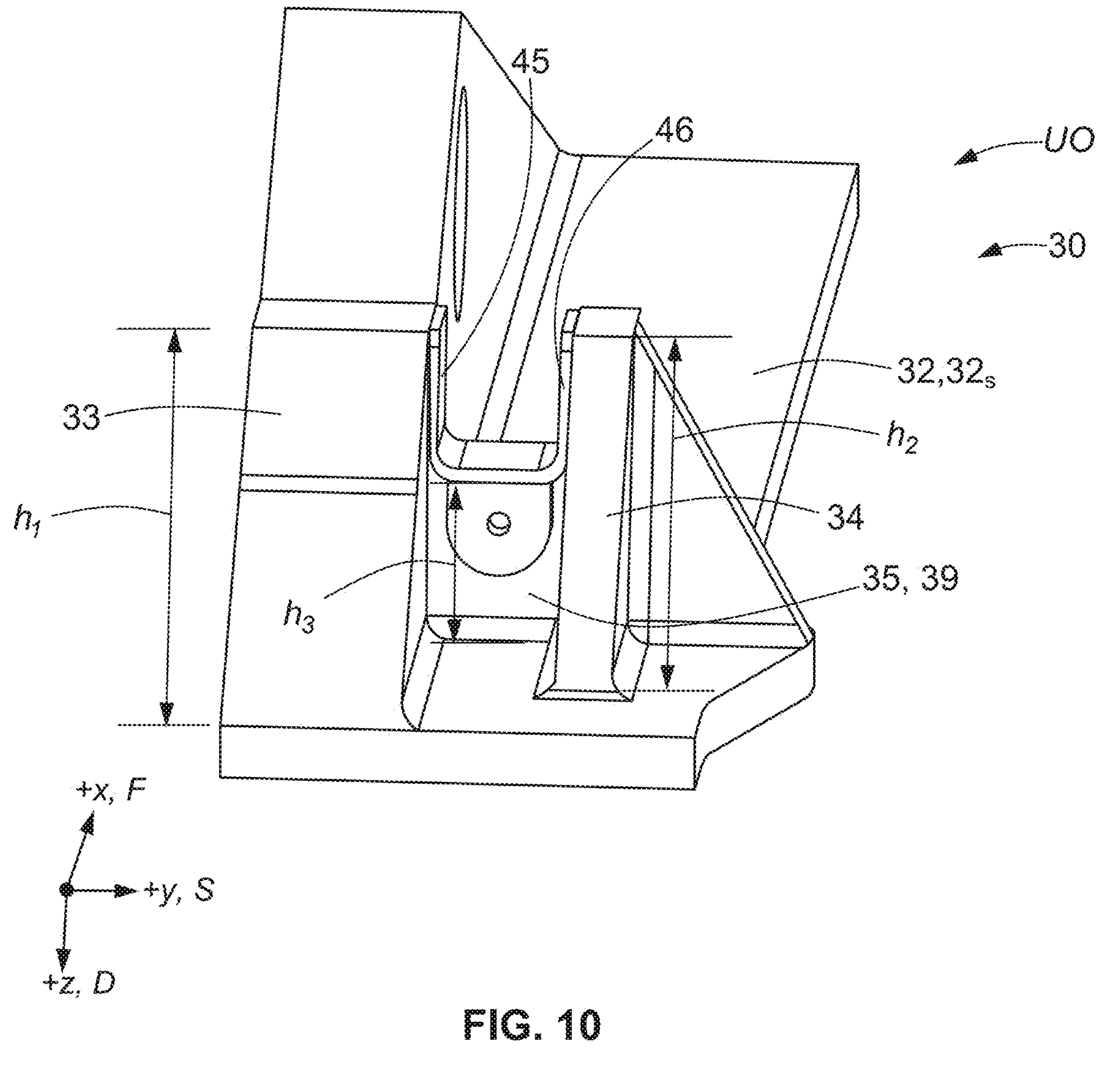
FIG. 10 is a schematic perspective view of a second component according to the first embodiment.
Figure 13:
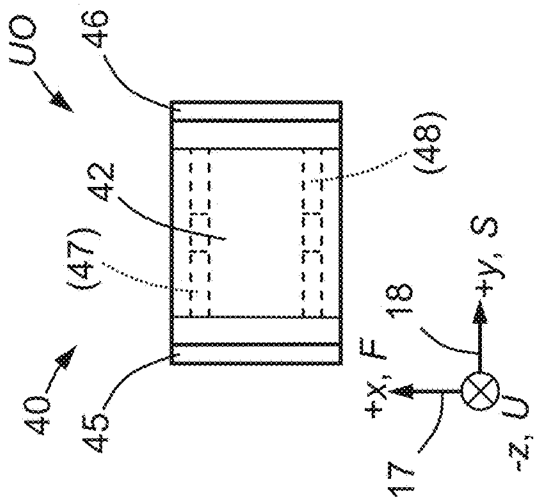
FIGS. 11-13 are schematic front, side and top views, respectively, of a bushing according to the first embodiment.
Figure 12:
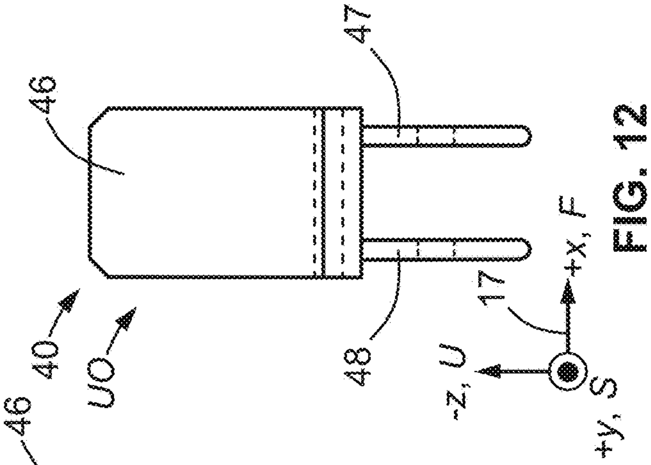
Figure 11:
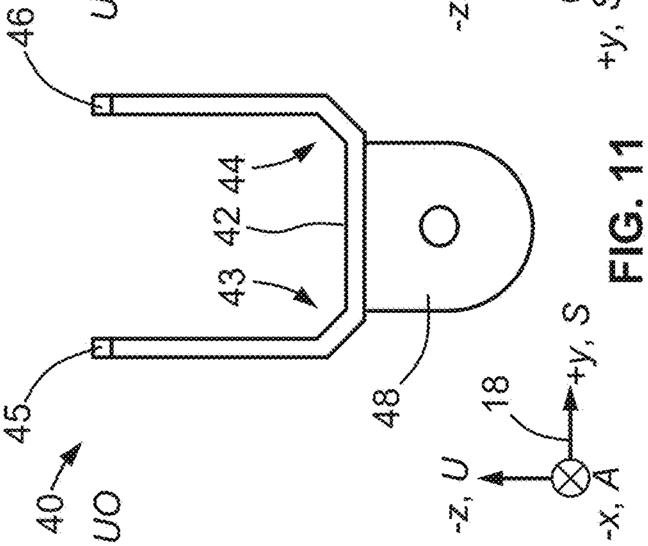
Figure 14:
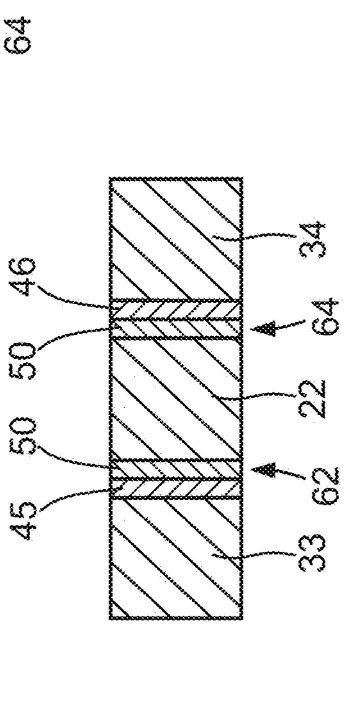

FIGS. 5-14 show various views of a structure 100 for transferring a lateral load $\mathbf{19}_L$ of an engine pylon 16 to a wing 14, according to a first embodiment. More specifically, FIGS. 5-7 show rear elevation, underneath perspective and side views, respectively, of the structure 100, FIGS. 8-9 show exploded and assembled schematic top views, respectively, of the structure 100, FIG. 10 shows a schematic perspective view of a second component 30, FIGS. 11-13 show schematic front, side and top views, respectively, of a bushing according to the first embodiment, and FIG. 14 shows a schematic cross-sectional diagram of how optional spacers 50 may be disposed in relation to adjacent elements of the structure 100.

The first component 20 includes a first base portion 24, with a first flange 22 extending outward (e.g., downward, as shown in FIGS. 5-9) from a first surface $\mathbf{24}_s$ of the first base portion 24 and extending generally longitudinally (i.e., generally along the longitudinal direction 17), with the first base portion 24 being configured for attachment to or integration with either the wing 14 or the engine pylon 16. (As used herein, a first element being "configured for integration with", "made integral with" or "integrated with" a second element means that the first and second elements are formed together as a single, unitary piece; in this case, the two elements may optionally be made of the same material. In this manner, an existing construction of the wing 14 and pylon 16 may be utilized for attachment with the structure 100, or the construction may be suitably modified to permit integration with the structure 100.) Thus, the first base portion 24 may be attached to the wing 14 via suitable fasteners, or the first base portion 24 may be formed as part of the wing 14 during the manufacturing process. An optional second flange 28 may also extend outward from the first surface $\mathbf{24}_s$ of the first base portion 24 and may run generally parallel with the first flange 22, thereby defining an interflange gap 29 between the first and second flanges 22, 28.

The second component 30 (see FIG. 10) has a second base portion 32, a first raised portion 33 extending outward (e.g., upward) from a second surface $\mathbf{32}_s$ of the second base portion 32 to a first height $h_1$, a second raised portion 34 extending outward (e.g., upward) from the second base portion 32 to a second height $h_2$ and being laterally spaced apart from the first raised portion 33, and a wall portion 35 extending outward (e.g., upward) from the second base portion 32 and laterally between the first and second raised portions 33, 34 to a third height $h_3$ that is less than either of the first and second heights $h_1$, $h_2$. The first and second raised portions 33, 34 may be generally parallel with each other, and the wall portion 35 may be attached to or made integral with the first and second raised portions 33, 34. Whereas the first base portion 24 may be attached to or made integral with one of the wing 14 and the engine pylon 16, the second base portion 32 may be attached to or made integral with the other of the wing 14 and the engine pylon 16. For example, the first base portion 24 may be attached to or integrated with the wing 14, and the second base portion 32 may be attached to or integrated with the pylon 16; alternatively, the first base portion 24 may be attached to or integrated with the pylon 16, and the second base portion 32 may be attached to or integrated with the wing 14.

The bushing 40 (see FIGS. 11-13) has a base plate 42 with opposed first and second base plate ends 43, 44, a first arm 45 extending from the first base plate end 43, and a second arm 46 extending from the second base plate end 44. For example, the first and second arms 45, 46 may extend in the same direction, which may be a direction that is perpendicular to the direction along which the base plate 42 extends. In this first embodiment, the bushing 40 is disposed with the base plate 42 positioned atop or in contact with the wall portion 35, and more specifically with the wall portion end 36, and with the first and second arms 45, 46 in an upright orientation UO (i.e., with the first and second arms 45, 46 pointing generally in the upward direction U toward the first base portion 24; see FIGS. 5-6 and 8-10). The first and second arms 45, 46 may be generally parallel with each other, and may be disposed against and in contact with the first and second raised portions 33, 34, respectively. As illustrated in the drawings, the first and second components 20, 30 and the bushing 40 may be arranged with at least part of the first flange 22 being disposed between the first and second arms 45, 46, such that the engine pylon 16 is substantially restrained against lateral movement 19 with respect to the wing 14.

To aid in restraining the engine pylon 16 against any substantial lateral movement 19 with respect to the wing 14, the structure 100 may also include one or more spacers 50. As illustrated in FIG. 14, the one or more spacers 50 may be inserted or disposed between various adjacent elements to take up most or all of any slack or gaps therebetween. For example, the spacers 50 may be inserted or disposed in one or both of (i) a first position 62 between the first flange 22 and the first arm 45, and (ii) a second position 64 between the first flange 22 and the second arm 46. These spacers 50 may optionally serve as bushings or bearings.

Returning to the exploded, schematic top view of FIG. 8, the first flange 22 may have a first pin hole 54 defined therein, the first raised portion 33 may have a second pin hole 56 defined therein, and the optional second flange 28 may have a third pin hole 58 defined therein, with the first, second and third pin holes 54, 56, 58 being located in operational alignment or registration with each other. That is, for example, when the first component 20 is disposed with its first flange 22 extending downward, the second component 30 is positioned underneath the first component 20 with its first and second raised portions 33, 34 extending upward toward the first component 20, the bushing 40 is disposed atop or in contact with the wall portion end 36 with the first and second arms 45, 46 extending upward toward the first base portion 24 (e.g., in an upright orientation UO), the first flange 22 is interfaced with the second component 30 such that an appropriate portion 27 of the first flange 22 (circled in dotted lines in FIG. 8) is disposed between the first and second arms 45, 46 and the first and second pin holes 54, 56 are aligned or in registration with each other, as shown in the assembled view of FIG. 9, then a suitable pin 60 may be disposed through the first and second pin holes 54, 56. For example, the pin 60 may be a fuse pin or any other suitable pin or fastener. Note that if the first component 20 includes an optional second flange 28 with a third pin hole 58 defined therein in operational alignment or registration with the first and second pin holes 54, 56 as shown in FIGS. 8-9, then the pin 60 may be disposed through the third pin hole 58 as well.

As illustrated in FIG. 8, the wall portion 35 may have a front face 38 and a rear face 39, and the bushing 40 may include one or both of a first tang 47 and a second tang 48. The first tang 47 may extend outward (e.g., downward) from the base plate 42 toward the second base portion 32 and may be disposed in contact with the front face 38, and the second tang 48 may extend outward (e.g., downward) from the base plate 42 in the same direction as the first tang 47 and may be disposed in contact with the rear face 39. Suitable fasteners (not shown) may be utilized to attach the first and/or second tangs 47, 48 to the wall portion 35, such as by insertion of the fasteners through holes defined in the first and/or second tangs 47, 48.

As noted above, the structure 100 may include a second flange 28 extending outward (e.g., downward) from the first base portion 24 and running generally parallel with the first flange 22, with an interflange gap 29 defined between the first and second flanges 22, 28. The first raised portion 33 may be disposed within the interflange gap 29, with a thickness ty of the first raised portion 33 being less than a width $w_{29}$ of the interflange gap 29.

In contrast with the abovementioned customary approach, the structure 100 of the present disclosure solves the technical problem of having undesirable lateral movement 19 between the engine pylon 16 and the wing 14, by the technical effect of providing a structure 100 which minimizes, avoids or eliminates such lateral movement 19, thereby providing significant benefits and technical advantages which are not taught or suggested by other known approaches. These benefits and technical advantages include the use of structural elements and features which offer improved constraint against lateral movement 19, less complexity, less cost and/or higher reliability as compared to previous approaches.

In the foregoing first embodiment, the structure 100 is described in a fully assembled state 70. However, the structure 100 may be alternatively described as a collection of elements which are configured for assembly into an assembled state 70. For example, the structure 100 may include: (i) a first component 20 having a first base portion 24 and a first flange 22 extending downward from the first base portion 24; (ii) a second component 30 having a second base portion 32, a first raised portion 33 extending outward (e.g., upward) from the second base portion 32 to a first height $h_1$, a second raised portion 34 extending outward (e.g., upward) from the second base portion 32 to a second height $h_2$ and being laterally spaced apart from the first raised portion 33, and a wall portion 35 extending outward (e.g., upward) from the second base portion 32 between the first and second raised portions 33, 34 to a third height $h_3$ that is less than either of the first and second heights $h_1$, $h_2$ with the wall portion 35 terminating at a wall portion end 36; and (iii) a bushing 40 having a base plate 42 with opposed first and second base plate ends 43, 44, a first arm 45 extending from the first base plate end 43, and a second arm 46 extending from the second base plate end 44.

In this alternative description, the first component 20, the second component 30 and the bushing 40 are configured to be assembled in an assembled state 70. In this configuration, the first component 20 may be disposed so that the first flange 22 is oriented generally longitudinally, the bushing 40 may be disposed with the base plate 42 positioned atop or in contact with the wall portion end 36 and with the first and second arms 45, 46 extending toward the first base portion 24 (e.g., in an upright orientation UO), and at least part of the first flange 22 may be disposed between the first and second arms 45, 46, such that the first and second components 20, 30 are substantially restrained against lateral movement 19 with respect to each other.

In this configuration, the first base portion 24 may be attached to or made integral with one of the wing 14 and the engine pylon 16, and the second base portion 32 may be attached to or made integral with the other of the wing 14 and the engine pylon 16. Additionally, the structure 100 may further include one or more spacers 50 disposed in one or both of (i) a first position 62 between the first flange 22 and the first arm 45 and (ii) a second position 64 between the first flange 22 and the second arm 46. When the first component 20, the second component 30 and the bushing 40 are arranged and assembled into the assembled state 70, with the first and second base portions 24, 32 attached to or integrated with the wing 14 and engine pylon 16, then the engine pylon 16 may be substantially restrained against lateral movement 19 with respect to the wing 14.

Figure 15:
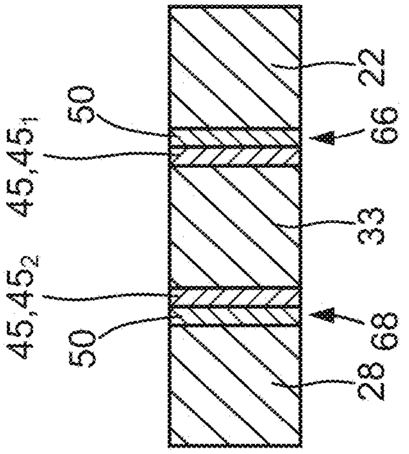
FIGS. 14-15 are schematic cross-sectional diagrams of how optional spacers may be disposed in relation to adjacent elements for the first and second embodiments, respectively.
Figure 16:
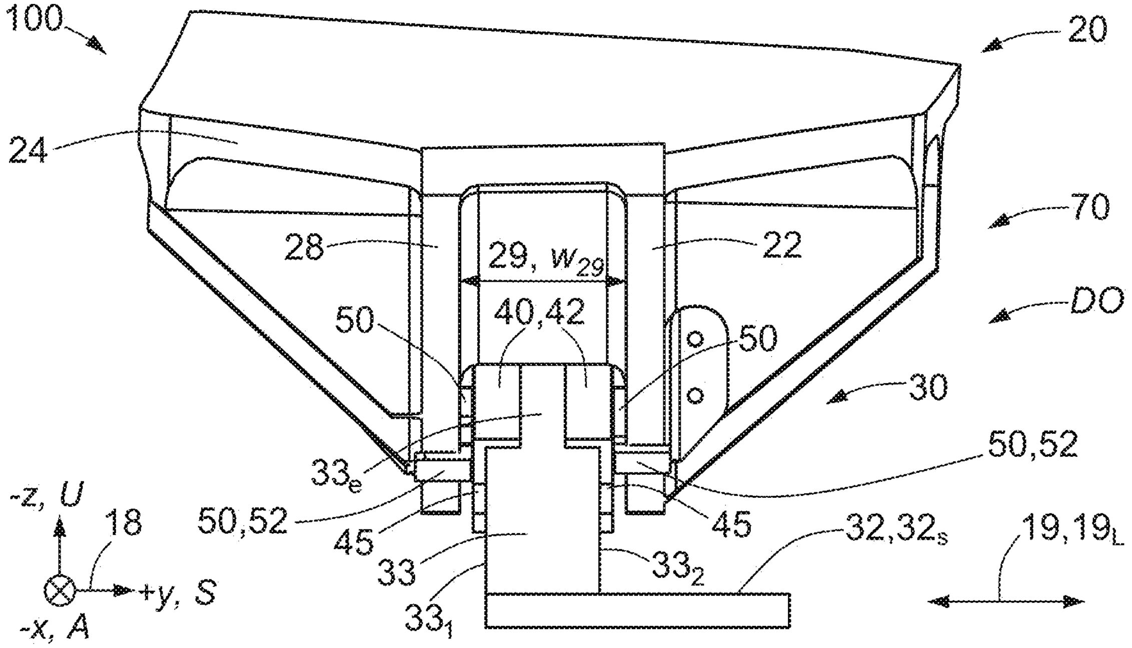
FIGS. 16-18 are rear elevation, underneath perspective and side views, respectively, of a structure for transferring a lateral load of an engine pylon to a wing of an aircraft, according to a second embodiment.
Figure 17:
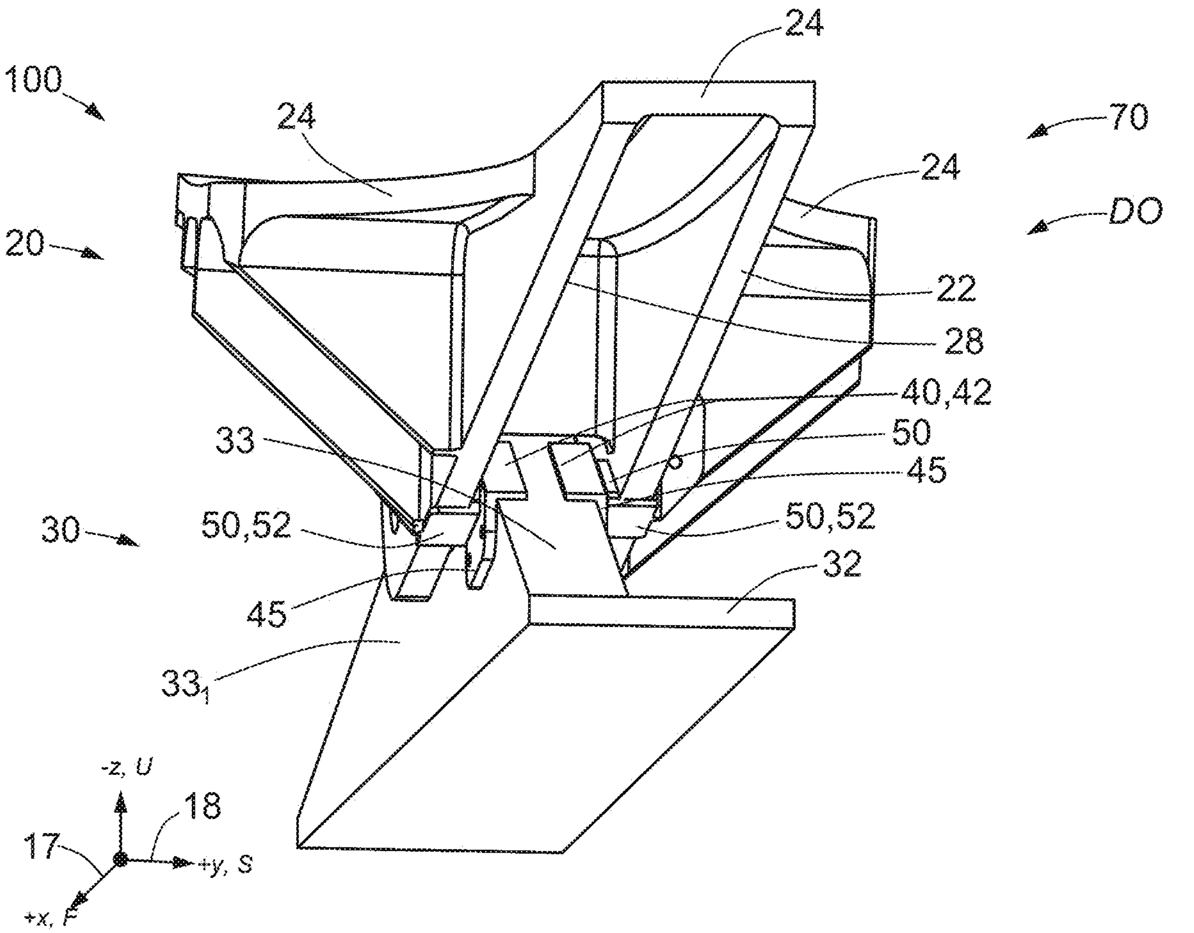
Figure 18:
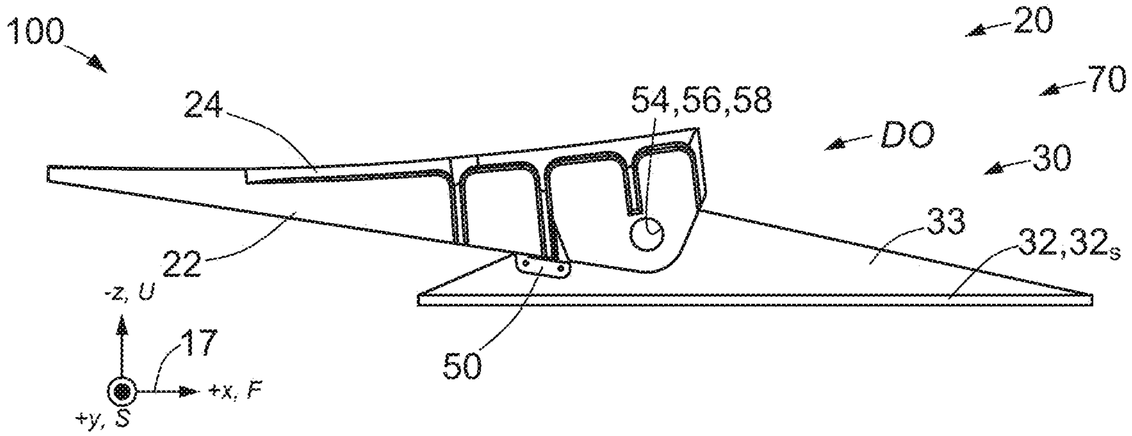
Figure 19:
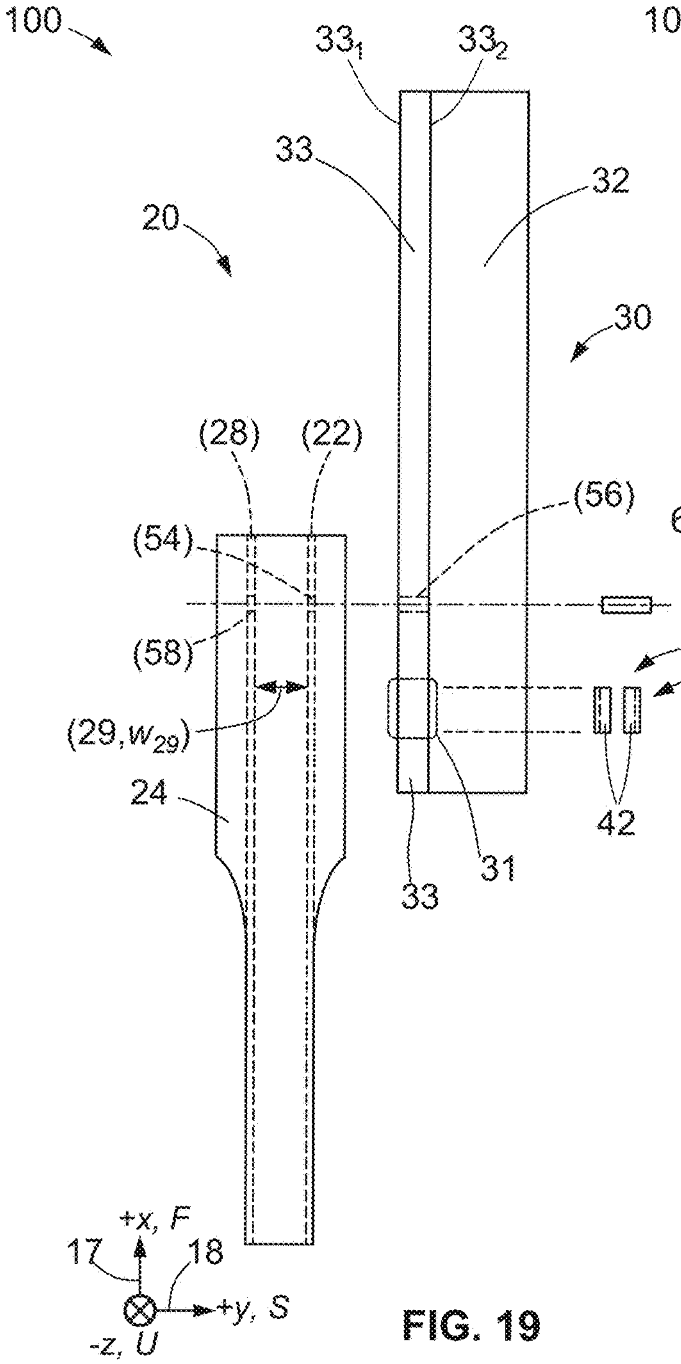
FIGS. 19-20 are exploded and assembled schematic top views, respectively, of the second embodiment.
Figure 20:
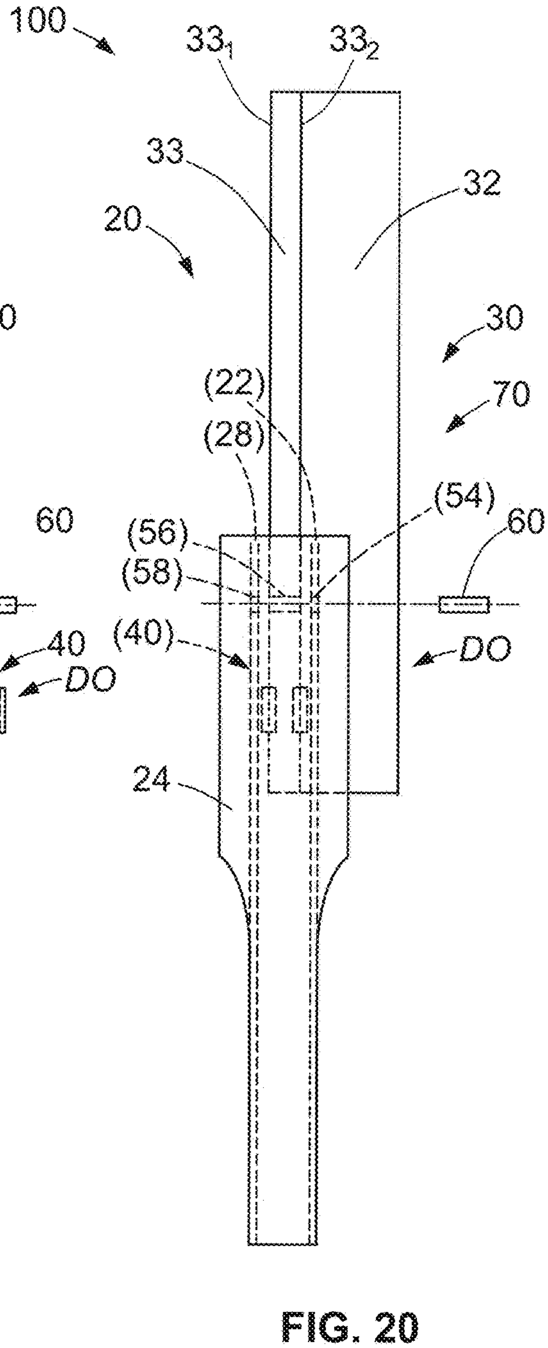
Figure 23:
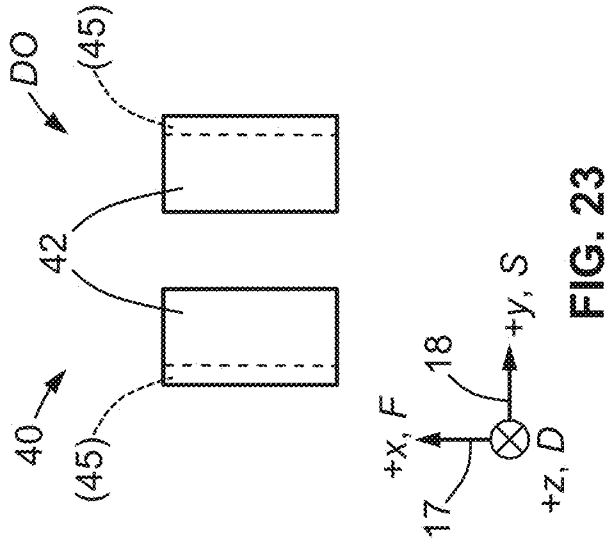
FIGS. 21-23 are schematic front, side and bottom views, respectively, of two bushings used in some arrangements of the second embodiment.
Figure 22:
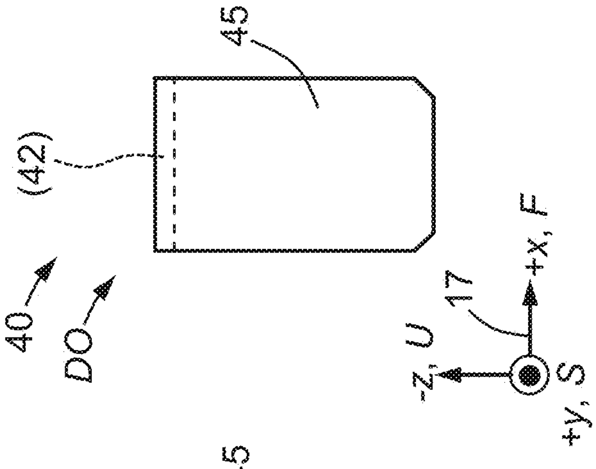
Figure 21:
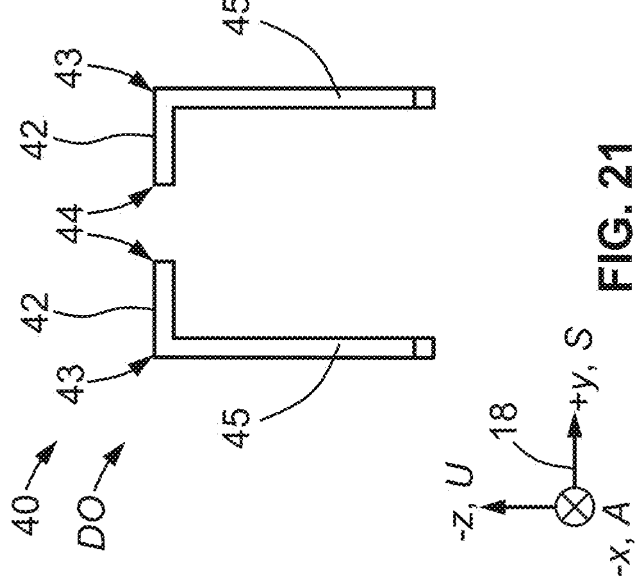
Figure 26:
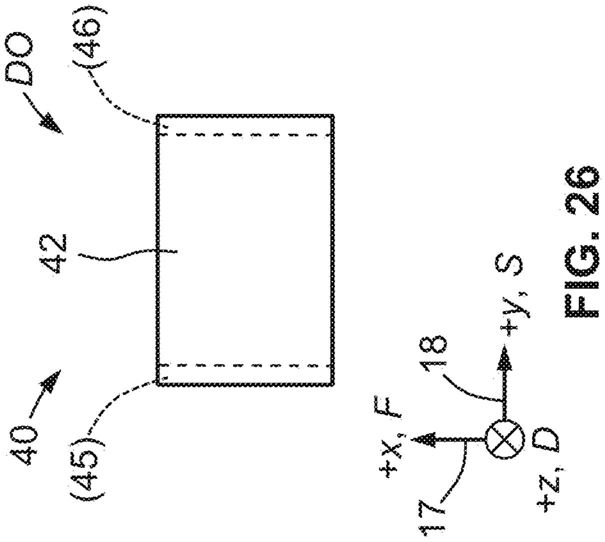
FIGS. 24-26 are schematic front, side and bottom views, respectively, of a single bushing used in other arrangements of the second embodiment.
Figure 25:
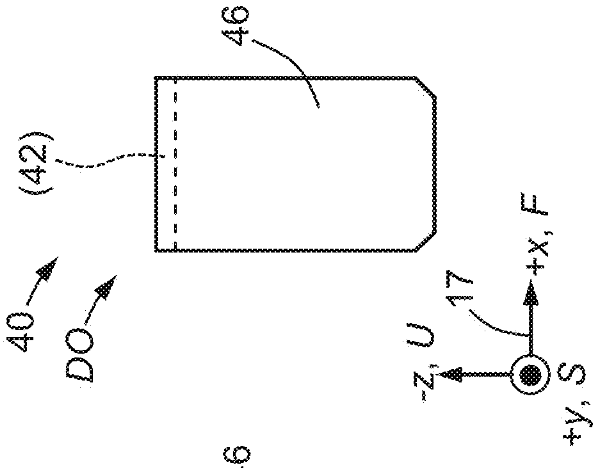
Figure 24:
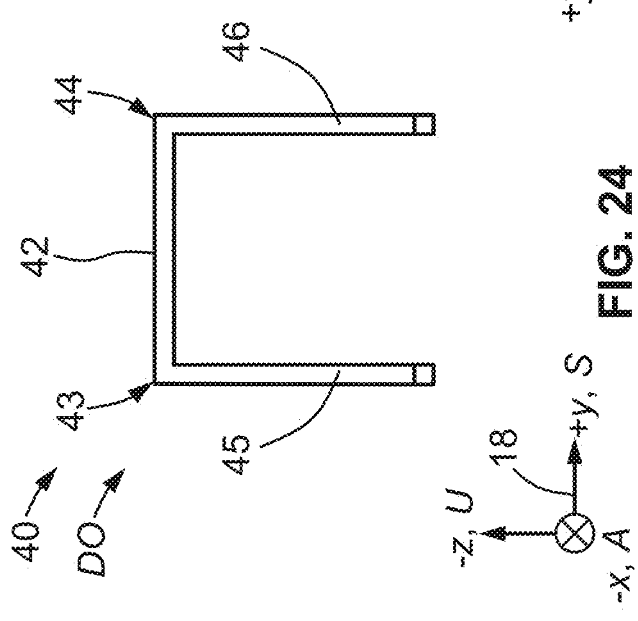

FIGS. 15-26 show various views of a second embodiment of the structure 100. More specifically, FIG. 15 shows a schematic cross-sectional diagram of how optional spacers 50 may be disposed in relation to adjacent elements of the structure 100, FIGS. 16-18 show rear elevation, underneath perspective and side views, respectively, of the structure 100, FIGS. 19-20 show exploded and assembled schematic top views, respectively, of the structure 100, FIGS. 21-23 show schematic front, side and top views, respectively, of a bushing 40 according to some configurations of the second embodiment, and FIGS. 24-26 show schematic front, side and top views, respectively, of a bushing 40 according to other configurations of the second embodiment.

In this second embodiment, the structure 100 includes a first component 20 a second component 30 and one or more bushings 40. The first component 20 has a first base portion 24 with a first flange 22 oriented generally longitudinally and extending outward (e.g., downward) from the first base portion 24, wherein the first base portion 24 is attached to or made integral with one of the wing 14 and the engine pylon 16. A second flange 28 extends outward (e.g., downward) from the first surface $24_s$ of the first base portion 24 and runs generally parallel with the first flange 22, thereby defining an interflange gap 29 between the first and second flanges 22, 28. The first base portion 24 may be attached to or made integral with one of the wing 14 and the engine pylon 16.

The second component 30 has a second base portion 32 and an raised portion 33 extending outward (e.g., upward) from the second surface $32_s$ of the second base portion 32 toward the first base portion 24, with the raised portion 33 terminating at a raised portion end $33_e$. (From a comparison of FIGS. 8-9 of the first embodiment and FIGS. 19-20 of the second embodiment, it may be noted that the raised portion 33 of the second embodiment is analogous to the first raised portion 33 of the first embodiment; thus, both of these elements use the same reference numeral "33" herein.) Whereas the first base portion 24 may be attached to or made integral with one of the wing 14 and the engine pylon 16, the second base portion 32 may be attached to or made integral with the other of the wing 14 and the engine pylon 16.

Note that FIGS. 16-17 and 19-23 show the one or more bushings 40 comprising two bushings 40, while FIGS. 24-26 show only one bushing 40. Each of the one or more bushings 40 has a respective base plate 42 with respective opposed first and second base plate ends 43, 44, and a respective first arm 45 extending from the first base plate end 43; optionally, as shown in FIGS. 24-26, the bushing 40 may also include a second arm 46 extending from the second base plate end 44. Each of the one or more bushings 40 is disposed with its respective base plate 42 atop or in contact with the raised portion 33, and more specifically with the raised portion end $33_e$, and with the respective first arm 45 extending toward the second base portion 32 (e.g., in a downward orientation DO) between the raised portion 33 and the first or second flange 22, 28. For example, as shown in each of FIGS. 16-17 and 20, one bushing 40 may be interposed between the raised portion 33 and the first flange 22, and another bushing 40 may be interposed between the raised portion 33 and the second flange 28. Alternatively, in configurations where a bushing 40 having first and second arms 45, 46 is used, the first arm 45 may be interposed between the raised portion 33 and the first flange 22, and the second arm 46 may be interposed between the raised portion 33 and the second flange 28. In either case, in the assembled state 70 and with the first and second base portions 24, 32 being attached to or integrated with the wing 14 and the pylon 16, at least part of the raised portion 33 and at least part of the one or more bushings 40 are disposed within the interflange gap 29, such that the engine pylon 16 is substantially restrained against lateral movement 19 with respect to the wing 14.

Although the first and second embodiments share some similarities with each other, they also have some differences between them. For example, while the first embodiment may utilize a single flange—i.e., a first flange 22—the second embodiment utilizes two flanges—i.e., a first flange 22 and a second flange 28. Additionally, while the second component 30 of the first embodiment utilizes two raised portions—i.e., a first raised portion 33 and a second raised portion 34—the second embodiment may utilize a single raised portion—i.e., raised portion 33. Further, while the first embodiment utilizes a single bushing 40 disposed so as to extend toward the first base portion 24 (e.g., in an upright orientation UO), the second embodiment utilizes a one or more bushings 40 disposed so as to extend toward the second base portion 32 (e.g., in a downward orientation DO).

Continuing on with the second embodiment, in configurations where two bushings 40 are used, the first arms 45 of the two bushings 40 may be generally parallel with each other and may be disposed in contact with respective opposed first and second sides $33_1$, $33_2$, respectively, of the raised portion 33. Additionally, in configurations utilizing two bushings 40, the respective base plates 42 of the two bushings 40 may be laterally aligned with each other.

As illustrated in the schematic cross-sectional diagram of FIG. 15, the structure 100 may also include one or more spacers 50 disposed in one or both of (i) a primary position 66 between the first flange 22 and a first adjacent one 451 of the first arms 45 of the one or more bushings 40, and (ii) a secondary position 68 between the second flange 28 and a second adjacent one 452 of the first arms 45 of the one or more bushings 40. Optionally, each of the one or more spacers 50 may include a respective tab 52 extending laterally away from the raised portion 33.

FIG. 19 shows an exploded, schematic top view of the first and second components 20, 30 and two bushings 40. (Although this drawing and the description immediately below involve two bushings 40, the concepts presented apply equally to structures 100 having only one bushing 40 and also to structures 100 having more than two bushings 40.) The first flange 22 may have a first pin hole 54 defined therein, the raised portion 33 may have a second pin hole 56 defined therein in registration or operational alignment with the first pin hole 54, and the second flange 28 may have a third pin hole 58 defined therein in registration or operational alignment with the first and second pin holes 54, 56. That is, when the two bushings 40 are disposed atop or in contact with a suitable portion 31 of the raised portion 33, and more specifically a portion 31 of the raised portion end $33_e$ (enclosed in dotted lines in FIG. 19) with the respective first arms 45 extending toward the second base portion 32 (e.g., in a downward orientation DO), and the first component 20 is positioned such that the first and second flanges 22, 28 are interfaced with the second component 30 with the first and second flanges 22, 28 being disposed on either side of the first and second clevis arms 45, 46 (i.e., at least part of the raised portion 33 and at least part of the bushing 40 are disposed within the interflange gap 29 between the first and second flanges 22, 28), and the first, second and third pin holes 54, 56, 58 are aligned or in registration with each other, as shown in the assembled view of FIG. 20, then a suitable pin 60 may be disposed through the first, second and third pin holes 54, 56, 58.

FIGS. 21-23 show schematic front, side and top views, respectively, of a pair of bushings 40 that may be used in some arrangements of the second embodiment. As with the first embodiment, each bushing 40 of the second embodiment has a base plate 42 with opposed first and second base plate ends 43, 44, and a first arm 45 extending from the first base plate end 43. However, unlike the bushing 40 of the first embodiment in which the base plate 42 of bushing 40 is disposed atop or in contact with a wall portion 35 with the first and second arms 45, 46 extending toward the first base portion 24 (e.g., in an upright orientation UO), in the second embodiment the base plate 42 of the bushing 40 is disposed atop or in contact with the raised portion 33 with the first arm(s) 45 extending toward the second base portions 32 (e.g., in a downward orientation DO).

FIGS. 24-26 show schematic views of a single bushing 40 that may be used in other arrangements of the second embodiment. Here, the bushing 40 has a base plate 42 with opposed first and second base plate ends 43, 44, a first arm 45 extending from the first base plate end 43, and a second arm 46 extending from the second base plate end 44. This configuration of the bushing 40 with first and second arms 45, 46 may be structurally similar to the bushing 40 utilized in the first embodiment, but while the first and second arms 45, 46 are oriented toward the first base portion 24 (e.g., in an upright orientation UO) in the first embodiment, here in the second embodiment the first and second arms 45, 46 extend in the opposite direction—i.e., toward the second base portion 32 (e.g., in a downward orientation DO).

The second embodiment may also be alternatively described as a collection of elements which are configured for assembly into an assembled state 70. For example, the structure 100 may include: (i) a first component 20 having a first base portion 24, a first flange 22 extending outward (e.g., downward) from the first base portion 24, and a second flange 28 extending outward (e.g., downward) from the first base portion 24 and running generally parallel with the first flange 22, thereby defining an interflange gap 29 between the first and second flanges 22, 28; (ii) a second component 30 having a second base portion 32 and a raised portion 33 extending outward (e.g., upward) from the second base portion 33 with the raised portion 33 terminating at a raised portion end $33_e$; and (iii) one or more bushings 40 each having a respective base plate 42 with respective opposed first and second base plate ends 43, 44 and a respective first arm 45 extending from the respective first base plate end 43.

In this alternative description, the first and second components 20, 30 and the one or more bushings 40 are configured to be assembled in an assembled state 70. In this assembled state 70, each of the first and second flanges 22, 28 may be oriented generally longitudinally, each of the one or more bushings 40 may be disposed with its respective base plate 42 atop or in contact with the raised portion end $33_e$ with its respective first arms 45 extending toward the second base portion 32 between the raised portion 33 and the first or second flange 22, 28 (e.g., in a downward orientation DO), and at least part of the raised portion 33 and at least part of the one or more bushings 40 may be disposed within the interflange gap 29, such that the first and second components 20, 30 are substantially restrained against lateral movement 19 with respect to each other.

In this configuration, the first base portion 24 may be attached to or made integral with one of the wing 14 and the engine pylon 16, and the second base portion 32 may be attached to or made integral with the other of the wing 14 and the engine pylon 16. Additionally, the structure 100 may further include one or more spacers 50 disposed in one or both of (i) a primary position 66 between the first flange 22 and a first adjacent one of the one or more bushings 40 and (ii) a secondary position 68 between the second flange 28 and an adjacent second one of the one or more bushings 40. When the first component 20, the second component 30 and the one or more bushings 40 are arranged and assembled into the assembled state 70, with the first base portion 24 being attached to or made integral with one of the wing 14 and the engine pylon 16 and the second base portion 32 being attached to or made integral with the other of the wing 14 and the engine pylon 16, then the engine pylon 16 may be substantially restrained against lateral movement 19 with respect to the wing 14.

As one having skill in the relevant art will appreciate, the structure 100 of the present disclosure may be presented or arranged in a variety of different configurations and embodiments.

According to one embodiment, a structure 100 is provided for transferring a lateral load $19_L$ of an engine pylon 16 to a wing 14 of an aircraft 10, wherein the aircraft 10 defines a longitudinal direction 17 and a lateral direction 18 perpendicular to the longitudinal direction 17. The structure 100 includes: (i) a first component 20 having a first base portion 24 and a first flange 22 oriented generally longitudinally and extending outward from the first base portion 24, wherein the first base portion 24 is attached to or made integral with one of the wing 14 and the engine pylon 16; (ii) a second component 30 having a second base portion 32, a first raised portion 33 extending outward from the second base portion 32 toward the first base portion 24 to a first height $h_1$, a second raised portion 34 extending outward from the second base portion 32 toward the first base portion 24 to a second height $h_2$ and being laterally spaced apart from the first raised portion 33, and a wall portion 35 extending outward from the second base portion 32 between the first and second raised portions 33, 34 to a third height $h_3$ that is less than either of the first and second heights $h_1$, $h_2$ with the wall portion 35 terminating at a wall portion end 36, wherein the second base portion 32 is attached to or made integral with the other of the wing 14 and the engine pylon 16; and (iii) a bushing 40 having a base plate 42 with opposed first and second base plate ends 43, 44, a first arm 45 extending from the first base plate end 43, and a second arm 46 extending from the second base plate end 44. The bushing 40 is disposed with the base plate 42 in contact with the wall portion end 36 and with the first and second arms 45, 46 extending toward the first base portion 24, and at least part of the first flange 22 is disposed between the first and second arms 45, 46, such that the engine pylon 16 is substantially restrained against lateral movement 19 with respect to the wing 14.

The first and second arms 45, 46 may be disposed in contact with the first and second raised portions 33, 34, respectively.

The structure 100 may also include one or more spacers 50 disposed in one or both of (i) a first position 62 between the first flange 22 and the first arm 45 and (ii) a second position 64 between the first flange 22 and the second arm 46.

The structure 100 may further include substantially no gap being provided between adjacent ones of the first raised portion 33, the first arm 45, the first flange 22, the second arm 46, the second raised portion 34 and the one or more spacers 50.

The first flange 22 may have a first pin hole 54 defined therein and the first raised portion 33 may have a second pin hole 56 defined therein in registration with the first pin hole 54, and the structure 100 may further include a pin 60 disposed through the first and second pin holes 54, 56.

The wall portion 35 may have a front face 38 and a rear face 39, and the bushing 40 may include one or both of a first tang 47 extending outward from the base plate 42 toward the second base portion 32 and being disposed in contact with the front face 38, and a second tang 48 extending outward from the base plate 42 toward the second base portion 32 and being disposed in contact with the rear face 39.

The structure 100 may include a second flange 28 extending outward from the first base portion 24 and running generally parallel with the first flange 22, thereby defining an interflange gap 29 between the first and second flanges 22, 28, wherein the first raised portion 33 is disposed within the interflange gap 29. A thickness $t_1$ of the first raised portion 33 may be less than a width $w_{29}$ of the interflange gap 29.

The first and second arms 45, 46 may be generally parallel with each other, and the first and second raised portions 33, 34 may be generally parallel with each other.

The wall portion 35 may be attached to or made integral with the first and second raised portions 33, 34.

According to another embodiment, a structure 100 is provided for transferring a lateral load $\mathbf{19}_L$ of an engine pylon 16 to a wing 14 of an aircraft 10, wherein the aircraft 10 defines a longitudinal direction 17 and a lateral direction 18 perpendicular to the longitudinal direction 17, including: (i) a first component 20 having a first base portion 24 and a first flange 22 extending outward from the first base portion 24; (ii) a second component 30 having a second base portion 32, a first raised portion 33 extending outward from the second base portion 32 to a first height $h_1$, a second raised portion 34 extending outward from the second base portion 32 to a second height $h_2$ and being laterally spaced apart from the first raised portion 33, and a wall portion 35 extending outward from the second base portion 32 between the first and second raised portions 33, 34 to a third height $h_3$ that is less than either of the first and second heights $h_1$, $h_2$ with the wall portion 35 terminating at a wall portion end 36; and (iii) a bushing 40 having a base plate 42 with opposed first and second base plate ends 43, 44, a first arm 45 extending from the first base plate end 43, and a second arm 46 extending from the second base plate end 44. The first component 20, the second component 30 and the bushing 40 are configured to be assembled in an assembled state 70 in which the first flange 22 is oriented generally longitudinally, the bushing 40 is disposed with the base plate 42 in contact with the wall portion end 36 and with the first and second arms 45, 46 extending toward the first base portion 24, and at least part of the first flange 22 is disposed between the first and second arms 45, 46, such that the first and second components 20, 30 are substantially restrained against lateral movement 19 with respect to each other.

The first base portion 24 may be attached to or made integral with one of the wing 14 and the engine pylon 16, and the second base portion 32 may be attached to or made integral with the other of the wing 14 and the engine pylon 16.

In the assembled state 70, the engine pylon 16 may be substantially restrained against lateral movement 19 with respect to the wing 14.

The structure 100 may further include one or more spacers 50 disposed in one or both of (i) a first position 62 between the first flange 22 and the first arm 45 and (ii) a second position 64 between the first flange 22 and the second arm 46.

According to yet another embodiment, a structure 100 is provided for transferring a lateral load $\mathbf{19}_L$ of an engine pylon 16 to a wing 14 of an aircraft 10, wherein the aircraft 10 defines a longitudinal direction 17 and a lateral direction 18 perpendicular to the longitudinal direction 17. The structure 100 includes: (i) a first component 20 having a first base portion 24, a first flange 22 oriented generally longitudinally and extending outward from the first base portion 24, and a second flange 28 extending outward from the first base portion 24 and running generally parallel with the first flange 22, thereby defining an interflange gap 29 between the first and second flanges 22, 28, wherein the first base portion 24 is attached to or made integral with one of the wing 14 and the engine pylon 16; (ii) a second component 30 having a second base portion 32 and an raised portion 33 extending outward from the second base portion 32 toward the first base portion 24 with the raised portion 33 terminating at a raised portion end $\mathbf{33}_e$, wherein the second base portion 32 is attached to or made integral with the other of the wing 14 and the engine pylon 16; and (iii) one or more bushings 40 each having a respective base plate 42 with respective opposed first and second base plate ends 43, 44, and a respective first arm 45 extending from the respective first base plate end 43. Each of the one or more bushings 40 is disposed with its respective base plate 42 in contact with the raised portion end $\mathbf{33}_e$ and with its respective first arm 45 extending toward the second base portion 32 between the raised portion 33 and the first or second flange 22, 28, and at least part of the raised portion 33 and at least part of the one or more bushings 40 are disposed within the interflange gap 29, such that the engine pylon 16 is substantially restrained against lateral movement 19 with respect to the wing 14.

The one or more bushings 40 may include two bushings 40, with one of the two bushings 40 having its first arm 45 on a first side of the raised portion 33 and the other of the two bushings 40 having its first arm 45 on a second side $\mathbf{33}_2$ of the raised portion 33 laterally opposite the first side $\mathbf{33}_1$.

The structure 100 may also include one or more spacers 50 disposed in one or both of (i) a primary position 66 between the first flange 22 and a first adjacent one of the one or more bushings 40 and (ii) a secondary position 68 between the second flange 28 and a second adjacent one of the one or more bushings 40.

Each of the one or more bushings 40 may include a respective second arm 46 extending from the respective second base plate end 44, with the first arm 45 extending between the raised portion 33 and the first flange 22 and the second arm 46 extending between the raised portion 33 and the second flange 28.

The first flange 22 may have a first pin hole 54 defined therein, the raised portion 33 may have a second pin hole 56 defined therein in registration with the first pin hole 54, and the second flange 28 may have a third pin hole 58 defined therein in registration with the first and second pin holes 54, 56, and the structure 100 may further include a pin 60 disposed through the first, second and third pin holes 54, 56, 58.

The one or more bushings 40 may include two bushings 40 having respective first arms 45 that are generally parallel with each other and respective base plates 42 that are laterally aligned with each other.

According to still another embodiment, a structure 100 is provided for transferring a lateral load $\mathbf{19}_L$ of an engine pylon 16 to a wing 14 of an aircraft 10, wherein the aircraft 10 defines a longitudinal direction 17 and a lateral direction 18 perpendicular to the longitudinal direction 17 including: (i) a first component 20 having a first base portion 24, a first flange 22 extending outward from the first base portion 24 and a second flange 28 extending outward from the first base portion 24 and running generally parallel with the first flange 22, thereby defining an interflange gap 29 between the first and second flanges 22, 28; (ii) a second component 30 having a second base portion 32 and a raised portion 33 extending outward from the second base portion 32 with the raised portion 33 terminating at a raised portion end $\mathbf{33}_e$; and (iii) one or more bushings 40 each having a respective base plate 42 with respective opposed first and second base plate ends 43, 44 and a respective first arm 45 extending from the respective first base plate end 43. The first component 20, the second component 30 and the one or more bushings 40 are configured to be assembled in an assembled state 70 in which the first and second flanges 22, 28 are oriented generally longitudinally, each of the one or more bushings 40 is disposed with its respective base plate 42 in contact with the raised portion end $\mathbf{33}_e$ and with its respective first arm 45 extending toward the second base portion 32 between the raised portion 33 and the first or second flange 22, 28, and at least part of the raised portion 33 and at least part of the one or more bushings 40 are disposed within the interflange gap 29, such that the first and second components 20, 30 are substantially restrained against lateral movement 19 with respect to each other.

The first base portion 24 may be attached to or made integral with one of the wing 14 and the engine pylon 16, and the second base portion 32 may be attached to or made integral with the other of the wing 14 and the engine pylon 16.

In the assembled state 70, the engine pylon 16 may be substantially restrained against lateral movement 19 with respect to the wing 14.

The structure 100 may further include one or more spacers 50 disposed in one or both of (i) a primary position 66 between the first flange 22 and a first adjacent one of the one or more bushings 40 and (ii) a secondary position 68 between the second flange 28 and a second adjacent one of the one or more bushings 40.

The above description is intended to be illustrative, and not restrictive. While the dimensions and types of materials described herein are intended to be illustrative, they are by no means limiting and are exemplary embodiments. In the following claims, use of the terms "first", "second", "top", "bottom", "upper", "lower", "upward", "downward", etc. are used merely as labels, and are not intended to impose numerical or positional requirements on their objects. As used herein, an element or step recited in the singular and preceded by the word "a" or "an" should be understood as not excluding plural of such elements or steps, unless such exclusion is explicitly stated. Additionally, the phrase "at least one of A and B" and the phrase "A and/or B" should each be understood to mean "only A, only B, or both A and B". Moreover, unless explicitly stated to the contrary, embodiments "comprising" or "having" an element or a plurality of elements having a particular property may include additional such elements not having that property. And when broadly descriptive adverbs such as "substantially" and "generally" are used herein to modify an adjective, these adverbs mean "mostly", "mainly", "for the most part", "to a significant extent", "to a large degree" and/or "at least 51 to 99% out of a possible extent of 100%", and do not necessarily mean "perfectly", "completely", "strictly", "entirely" or "100%". Additionally, the word "proximate" may be used herein to describe the location of an object or portion thereof with respect to another object or portion thereof, and/or to describe the positional relationship of two objects or their respective portions thereof with respect to each other, and may mean "near", "adjacent", "close to", "close by", "at" or the like.

This written description uses examples, including the best mode, to enable those skilled in the art to make and use devices, systems and compositions of matter, and to perform methods, according to this disclosure. It is the following claims, including equivalents, which define the scope of the present disclosure.

What is claimed is:

1. A structure for transferring a lateral load of an engine pylon to a wing of an aircraft, wherein the aircraft defines a longitudinal direction and a lateral direction perpendicular to the longitudinal direction, comprising:

a first component having a first base portion and a first flange oriented generally longitudinally and extending outward from the first base portion, wherein the first base portion is attached to or made integral with one of the wing and the engine pylon;

a second component having a second base portion, a first raised portion extending outward from the second base portion toward the first base portion to a first height, a second raised portion extending outward from the second base portion toward the first base portion to a second height and being laterally spaced apart from the first raised portion, and a wall portion extending outward from the second base portion between the first and second raised portions to a third height that is less than either of the first and second heights with the wall portion terminating at a wall portion end, wherein the second base portion is attached to or made integral with the other of the wing and the engine pylon; and a bushing having a base plate with laterally opposed first and second base plate ends, a first arm extending from the first base plate end, and a second arm extending from the second base plate end;

wherein the bushing is configured to be mounted to the second component in a manner such that the base plate of the bushing is in contact with the wall portion end of the second component, and the first and second arms of the bushing are positioned between the first and second raised portions of the second component; and wherein, when the first component is assembled with the second component, at least part of the first flange is disposed between the first and second arms of the bushing, such that the engine pylon is substantially restrained against lateral movement with respect to the wing.

2. The structure of claim 1, wherein the first and second arms are disposed in contact with the first and second raised portions, respectively.

3. The structure of claim 1, further comprising:
one or more spacers disposed in one or both of (i) a first position between the first flange and the first arm and (ii) a second position between the first flange and the second arm.

4. The structure of claim 3, wherein substantially no gap is provided between adjacent ones of the first raised portion, the first arm, the first flange, the second arm, the second raised portion and the one or more spacers.

5. The structure of claim 1, wherein the first flange has a first pin hole defined therein and the first raised portion has a second pin hole defined therein in registration with the first pin hole, and further comprising:
a pin disposed through the first and second pin holes.

6. The structure of claim 1, wherein the wall portion has a front face and a rear face, and wherein the bushing includes one or both of:
a first tang extending outward from the base plate toward the second base portion and being disposed in contact with the front face; and
a second tang extending outward from the base plate toward the second base portion and being disposed in contact with the rear face.

7. The structure of claim 1, further comprising:
a second flange extending outward from the first base portion and running generally parallel with the first flange, thereby defining an interflange gap between the first and second flanges;
wherein the first raised portion is disposed within the interflange gap.

8. The structure of claim 7, wherein a thickness of the first raised portion is less than a width of the interflange gap.

9. The structure of claim 1, wherein the first and second arms are generally parallel with each other, and wherein the first and second raised portions are generally parallel with each other.

10. The structure of claim 1, wherein the wall portion is attached to or made integral with the first and second raised portions.

11. A structure for transferring a lateral load of an engine pylon to a wing of an aircraft, wherein the aircraft defines a longitudinal direction and a lateral direction perpendicular to the longitudinal direction, comprising: a first component having a first base portion and a first flange extending outward from the first base portion; a second component having a second base portion, a first raised portion extending outward from the second base portion to a first height, a second raised portion extending outward from the second base portion to a second height and being laterally spaced apart from the first raised portion, and a wall portion extending outward from the second base portion between the first and second raised portions to a third height that is less than either of the first and second heights with the wall portion terminating at a wall portion end; and a bushing having a base plate with laterally opposed first and second base plate ends, a first arm extending from the first base plate end, and a second arm extending from the second base plate end; wherein the first component, the second component and the bushing are configured to be assembled in an assembled state in which: the first flange is oriented generally longitudinally; the bushing is mounted to the second component in a manner such that the base plate of the bushing is in contact with the wall portion end of the second component, and the first and second arms of the bushing are positioned between the first and second raised portions of the second component; and at least part of the first flange of the first component is disposed between the first and second arms of the bushing, such that the first and second components are substantially restrained against lateral movement with respect to each other.

12. The structure of claim 11, wherein the first base portion is attached to or made integral with one of the wing and the engine pylon, and wherein the second base portion is attached to or made integral with the other of the wing and the engine pylon.

13. The structure of claim 12, wherein in the assembled state, the engine pylon is substantially restrained against lateral movement with respect to the wing.

14. The structure of claim 13, further comprising:
one or more spacers disposed in one or both of (i) a first position between the first flange and the first arm and (ii) a second position between the first flange and the second arm.

15. A structure for transferring a lateral load of an engine pylon to a wing of an aircraft, wherein the aircraft defines a longitudinal direction and a lateral direction perpendicular to the longitudinal direction, comprising:
a first component having a first base portion and a first flange oriented generally longitudinally and extending outward from the first base portion, and a second flange extending outward from the first base portion and running generally parallel with the first flange, thereby defining an interflange gap between the first and second flanges, wherein the first base portion is attached to or made integral with one of the wing and the engine pylon;
a second component having a second base portion and a raised portion extending outward from the second base portion toward the first base portion with the raised portion terminating at a raised portion end, wherein the second base portion is attached to or made integral with the other of the wing and the engine pylon; and
one or more bushings each having a respective base plate with respective opposed first and second base plate ends and a respective first arm extending from the respective first base plate end;
wherein each of the one or more bushings is disposed with its respective base plate in contact with the raised portion end and with its respective first arm extending toward the second base portion between the raised portion and the first or second flange; and
wherein at least part of the raised portion and at least part of the one or more bushings are disposed within the interflange gap, such that the engine pylon is substantially restrained against lateral movement with respect to the wing.

16. The structure of claim 15, wherein the one or more bushings includes two bushings, with one of the two bushings having its first arm on a first side of the raised portion and the other of the two bushings having its first arm on a second side of the raised portion laterally opposite the first side.

17. The structure of claim 15, further comprising:
one or more spacers disposed in one or both of (i) a primary position between the first flange and a first adjacent one of the one or more bushings and (ii) a secondary position between the second flange and a second adjacent one of the one or more bushings.

18. The structure of claim 15, wherein each of the one or more bushings includes a respective second arm extending from the respective second base plate end, with the first arm extending between the raised portion and the first flange and the second arm extending between the raised portion and the second flange.

19. The structure of claim 15, wherein the first flange has a first pin hole defined therein, the raised portion has a second pin hole defined therein in registration with the first pin hole, and the second flange has a third pin hole defined therein in registration with the first and second pin holes, and further comprising:

a pin disposed through the first, second and third pin holes.

20. The structure of claim 15, wherein the one or more bushings includes two bushings having respective first arms that are generally parallel with each other and respective base plates that are laterally aligned with each other.

* * * * *